Oct. 30, 1956  W. S. BAKER  2,768,865
PISTON OR PACKING RINGS
Filed June 7, 1952  2 Sheets-Sheet 1

WELDON STANLEY BAKER
INVENTOR.

BY *[signature]*

ATTORNEY

Oct. 30, 1956 W. S. BAKER 2,768,865
PISTON OR PACKING RINGS
Filed June 7, 1952 2 Sheets-Sheet 2

WELDON STANLEY BAKER
INVENTOR.

BY *[signature]*

ATTORNEY

United States Patent Office 2,768,865
Patented Oct. 30, 1956

2,768,865

PISTON OR PACKING RINGS

Weldon Stanley Baker, Fort Worth, Tex., assignor to Safety Seal Piston Ring Company, Fort Worth, Tex., a corporation of Texas Application June 7, 1952, Serial No. 292,332

7 Claims. (Cl. 309—46)

This invention relates to new and useful improvements in piston or packing rings.

One object of the invention is to provide a new and improved piston or packing rings.

Another object of the invention is to provide a new and improved piston ring of the gap type being an improved tongue or bridging element projecting from one end portion thereof to engage the other end portion thereof in such a manner as to prevent outward movement of the tongue to prevent scoring of the piston walls by the tongue.

A particular object of the invention is to provide a new and improved piston ring of the overlapping gap type.

Still another object of the invention is to provide a new and improved piston ring of the type described wherein the tongue is adapted to engage within a recess in the opposite end portion of the ring, the tongue and the opposite end being provided with wedge or bevel surfaces which are engageable with each other and coact to prevent the tongue from being moved outwardly of the ring by pressure acting against the inner diameter surfaces of the ring and against the top surfaces of the ring.

A particularly important object of the invention is to provide a new and improved piston ring of the type described wherein pressure acting on the top or pressure side surfaces of the ring draws the tongue bridging or sealing member inwardly toward the center of the ring.

A still further object of the invention is to provide a piston or packing ring of the gap type having an improved bridging or sealing member, the piston or packing ring and the bridging or sealing member having wedge or bevel surfaces which are engageable with each other and coact to prevent the bridging or sealing member from being moved outwardly from the ring by pressure acting against the inner diameter surfaces of the ring and against the top or pressure-side surfaces of the ring.

Figure 1:
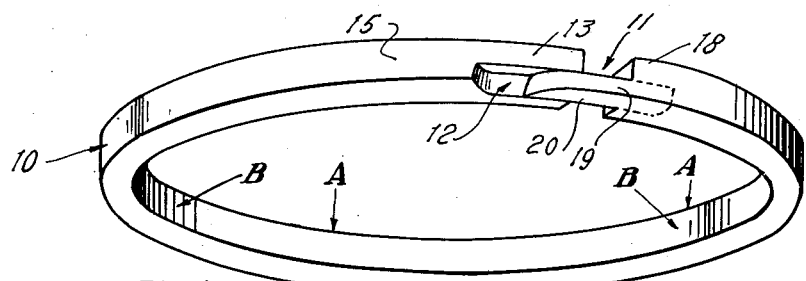
Figure 2:
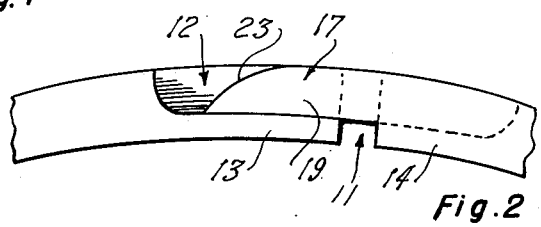
Figure 3:
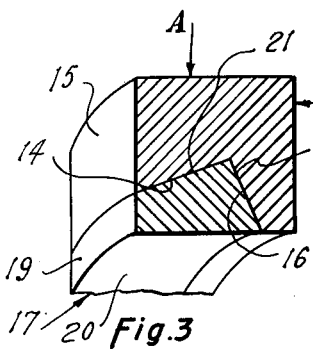
Figure 4:
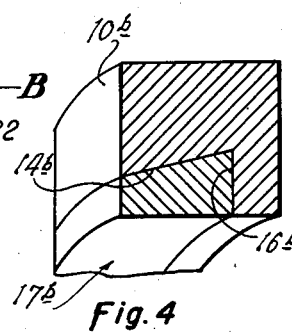
Figure 5:
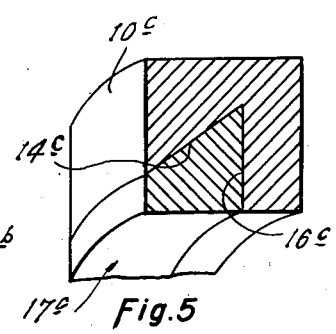
Figure 7:
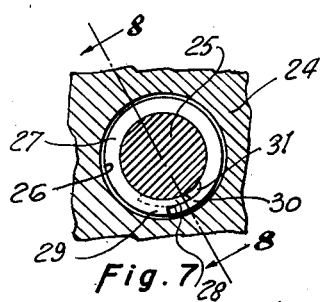
Figure 8:
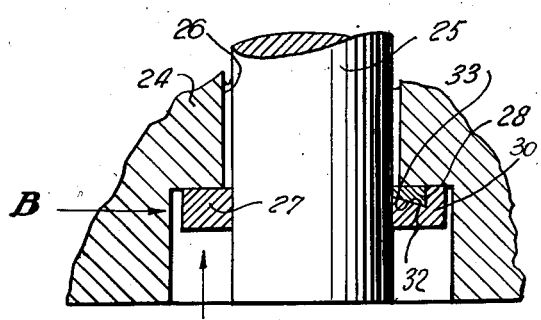
Figure 6:
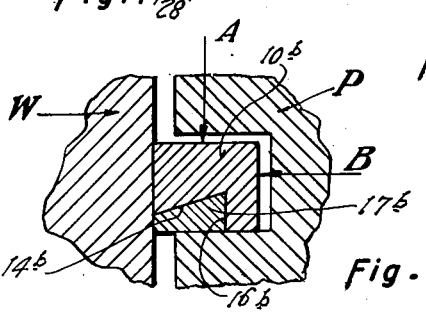
Figure 9:
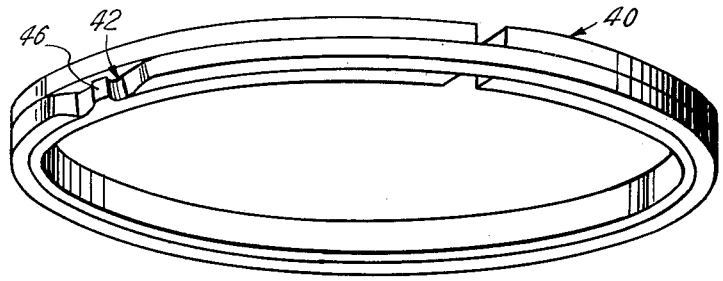
Figure 10:
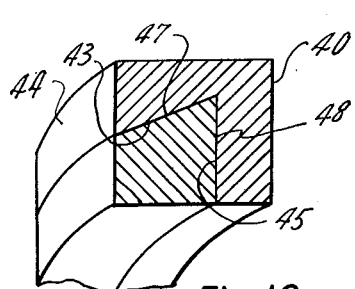
Figure 11:
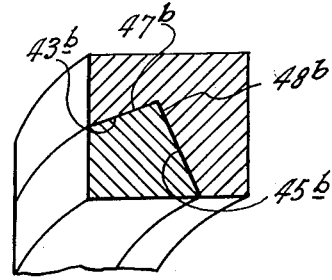
Figure 12:
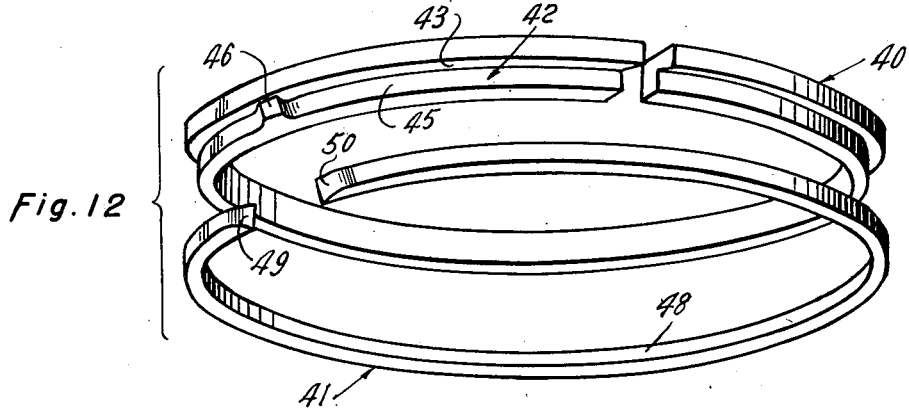

Additional objects and advantages of the invention will be readily apparent from the reading of the following description of devices constructed in accordance with the invention and reference to the accompanying drawings thereof, wherein:

Figure 1 is a perspective view of a piston or packing ring constructed in accordance with the invention, Figure 2 is an enlarged fragmentary bottom view showing the tongue or bridging member, Figure 3 to 5 are sectional views showing three different styles of wedge or bevel surfaces of the tongue and ring, Figure 6 is a fragmentary sectional view schematically illustrating the ring in sealing position with pressure applied thereto, Figure 7 is a top sectional view of a modified form of the packing ring of Figures 1 and 2 in place between a housing and a movable rod, Figure 8 is a vertical, sectional view taken on the line 8—8 of Figure 7, Figure 9 is a perspective view of a modified form of the packing ring of the invention having a circular bridging or sealing member, Figures 10 and 11 are sectional views showing different styles of wedge or bevel surfaces of the ring and the bridging or sealing member, and Figure 12 is an exploded view of the ring and bridging or sealing member illustrated in Figure 9.

Referring now particularly to Figures 1 to 3 of the drawings, the numeral 10 designates the annulus or body of a piston or packing ring of the usual structure split at one point 11 in its circumference. The annulus 10 is substantially rectangular in cross-section. An elongate arcuate recess or groove 12 is provided in one end 13 of the annulus and extends circumferentially from the end 13 in the lower and outer sides of the annulus. The surface or side 14 of the recess extends upwardly and inwardly from the outer side 15 of the annulus while the surface or side 16 extends downwardly and inwardly at a convenient angle. As shown in Figure 3, the side or surface 16 extends at a right angle from the side or surface 14 so that the recess 12 may be milled out by the use of an ordinary end mill. In Figures 4 and 5, the sides 16b and 16c are shown extending at an arcuate angle from the sides 14b and 14c, respectively, and are formed by the use of an undercutting mill or a special mill. The angle of the wedge surface may vary in degree, as desired.

An arcuate tongue or bridging member 17 is secured to the other end portion 18 of the annulus and has its inner and outer arcuate surfaces or peripheries 19 and 20 struck on arcs substantially concentric to those of the annulus when the ring is fully closed or compressed. The tongue 17 bridges the gap between the ends 13 and 18 of the annulus and its free end slidably engages or is disposed longitudinally within the recess 12. The tongue may be made integral with the end 18 of the annulus but is preferably formed of a piece of alloy steel or other suitable material which is permanently bonded to the end 18 throughout the entire length of its engagement with the end 18 of the annulus.

The tongue has a side or surface 21 which slidably engages the side or surface 14 of the annulus and which extends upwardly and inwardly from its outer surface 19 at the same angle as the side or surface 14 of the recess 12 which it abuts. The engaging sides 14 and 21 of the recess and the tongue may be termed wedge or bevel surfaces since they extend at an angle to the outer surfaces 14 and 19 of the annulus and the tongue. The side 22 of the tongue similarly engages the side 16 of the recess and extends downwardly at the same angle as the side 16. The engagement of the wedge or bevel surfaces 21 and 22 of the tongue with the wedge or bevel surfaces 14 and 16 of the tongue forms a seal between the tongue and the annulus which prevents the escape of fluids therebetween.

The annulus 10 is subjected both to downwardly acting forces indicated by the arrows A and to radially and outwardly acting forces indicated by arrows B when installed between a piston and a cylinder wall, as shown in Figures 1 and 6. The downwardly acting forces A will tend to move the annulus 10 downwardly and the resulting combining action of the wedge or bevel surface 14 of the annulus on the wedge or bevel surface 21 of the tongue will tend positively to draw the tongue inwardly toward the center of the annulus. The wedge or bevel surface 14 of the annulus by its engagement with the wedge or bevel surface 21 of the tongue also prevents the movement of the tongue outwardly with respect to the annulus by the outwardly acting forces B. The tongue is thus prevented from moving outwardly to project beyond the outer surface 15 of the annulus to score the wall of the cylinder, and likewise prevents the opposite end 13 from moving outwardly independently to score the cylinder wall.

It will be apparent that if the wedge or bevel surfaces 14 and 21 of the annulus and tongue wear as the tongue is moved inwardly and outwardly in the recess 12, the wear will not change the wedge or bevel shape of the surfaces so that even when these surfaces become worn they will continue to prevent the tongue from projecting outwardly of the annulus.

The end 23 of the tongue may be square or any other suitable shape, but is preferably convex and forms a scraping means for freeing the recess of foreign matter, whereby foreign matter, such as carbon or the like, which may accumulate in the recess 12 will tend to force the free end of the tongue inwardly and hold it in proper position on the annulus; and said scraping means will also keep the recess 12 scraped clear throughout the length of the tongue, to prevent foreign matter from packing between the tongue and ring and spreading the tongue outwardly from the ring end 13.

It will thus be seen that a piston or packing ring has been provided which includes a split annulus 10 having a tongue 17 bridging the gap between the ends of the annulus and extending slidably into a recess 12 provided in one end of the annulus, the tongue and recess having abutting or slidably engaging wedge or bevel surfaces 14 and 21 which cooperate to hold the tongue in the recess against outward displacement therefrom by forces acting on the annulus and to form a fluid tight seal between the tongue and the annulus.

The described packing ring may also be employed to seal between a housing 24 and a rod 25 movable longitudinally through a bore 26 in the housing and also through the ring. The packing ring employed for this purpose includes a split annulus 27 having a tongue 28 bridging the gap between the ends 29 and 30 of the annulus and having a free end slidably disposed in a recess 31 in the end 30. The recess 31 is in the inner and upper sides of the annulus and has a wedge or bevel surface 32 which slidably engages the wedge or bevel surface 33 of the tongue. It will be apparent that upwardly acting forces exerted on the annulus 27 will tend to move the tongue 28 outwardly away from the rod. The tongue 28 is thus prevented from projecting inwardly beyond the annulus and scoring the rod 25 as the latter moves longitudinally through the ring.

In Figures 9 to 11 is illustrated a two-piece piston or packing ring which includes a split annulus 40 and an outer sealing or bridging member 41 which is also annular in shape. The annulus 40 is provided with an annular groove 42 having an inwardly and upwardly side providing a wedge or bevel surface 43 which extends from the outer peripheral side or surface 44 of the annulus and a downwardly extending side 45. A vertical rib 46 projects radially from the side 45 to limit rotary movement of the bridging member on the annulus.

The sealing or bridging member 41 has an upper wedge or bevel surface 47 which slidably engages the wedge or bevel surface 43 of the annulus and an inner side 48 which slidably engages the side 45 of the annulus. The engagement of the wedge or bevel surfaces 43 and 47 of the annulus and the bridging member forms a fluid tight seal therebetween. In addition, any forces acting downwardly on the annulus 40 will tend to move the annulus downwardly and the resulting camming action of the wedge or bevel surface 43 on the wedge or bevel surface 47 of the bridging member will tend positively to draw the bridging member inwardly toward the center of the annulus. The wedge or bevel surface 43 of the annulus by its engagement with the bevel surface of the bridging member also prevents the outward movement of the bridging member due to radial outward forces exerted on the bridging member. The bridging member is then prevented from moving beyond the annulus to score the wall of a cylinder within which the piston packing ring is disposed.

As shown in Figure 9, the side 45 of the annulus 40 extends downwardly at an acute angle from the bevel surface 43. In Figure 11, the side 45b is shown extending at right angle from the bevel surface 43b in order to permit the forming of the groove 42 by the use of an ordinary end mill. The sides or surfaces 47b and 48b of the bridging member are in this case also disposed at right angles in order that the bridging member may fit properly on the annulus. The angle of the wedge surface may vary substantially in degree, as desired.

The ends 49 and 50 of the bridge member may be square or any other suitable shape, but are preferably convex whereby foreign matter, such as carbon or the like which may accumulate in the groove 42 between the rib 46 and the ends of the bridging member will tend to force the free ends of the bridging member inwardly and hold it in proper position on the annulus.

It will therefore be seen that a piston or packing ring has been provided which includes a split annulus 40 having a bridging member extending about it to bridge its gap, the annulus and bridging member having wedge or bevel surfaces 43 and 47, and 43b and 47b, which cooperate to hold the bridging member on the annulus against outward displacement therefrom by forces acting on the annulus and to form a fluid tight seal between the annulus and the bridging member.

The foregoing description of the invention is explanatory only, and changes in the details of the construction illustrated may be made by those skilled in the art, within the scope of the appended claims, without departing from the spirit of the invention.

What I claim and desire to secure by Letters Patent is:

1. A packing ring including, a split annulus having an arcuate groove in one of its ends, and an arcuate bridging member projecting from the other end and arranged to engage within said groove, said annulus and said bridging member having arcuate beveled surfaces concentric with said annulus slidably engaging each other to prevent said bridging member from projecting radially with respect to said annulus, said bridging member having an end provided with a convex surface curving from the extreme end portion of said end which forms a scraping means for scraping foreign matter from said groove and whereby foreign matter in said groove tends to force said bridging member inwardly into said groove.

2. A packing ring including, a split annulus having a substantially uniform cross-section throughout its annular length, said annulus having an arcuate groove in its outer and bottom sides, said annulus having an upper beveled surface defining the upper boundary of said groove extending inwardly and upwardly from the outer side of the annulus and a second surface extending downwardly at substantially a right angle from said upper beveled surface to the bottom side of said annulus and defining the other side of the groove, and an arcuate bridging member projecting from the other end of the annulus and arranged to engage within said groove, said bridging member having an arcuate upper beveled surface engaging said upper beveled surface of the annulus and a second surface extending downwardly at substantially a right angle from the upper beveled surface of the bridging member, said bridging member being cammed inwardly by the engagement of said bevel surfaces by forces acting downwardly and outwardly on said annulus whereby said bridging member is prevented from projecting radially outwardly beyond the outer side of the annulus.

3. A piston ring comprising, a split resilient annulus having a recess in its outer face extending inwardly from one of its split ends, and a tongue permanently fastened to the opposite end of said annulus and extending into said recess, said annulus and said tongue having slidably engaging bevel surfaces extending inwardly and upwardly from their outer peripheral surfaces whereby said tongue is prevented from projecting radially outwardly beyond said annulus by forces acting downwardly and outwardly on said annulus, said tongue having a free end provided with a convex outer surface curving outwardly and rearwardly from the extreme end portion of said free end whereby foreign matter in said recess is scraped free and prevented from forcing said tongue outwardly.

4. A piston ring including, a split annulus, an arcuate tongue projecting from one end of the annulus for bridging the gap at the split thereof, the other end of the annulus having a groove for receiving said tongue, said annulus and said tongue having engaging bevel surfaces extending radially inwardly and upwardly whereby said tongue member is prevented from projecting beyond said annulus, said tongue having a free end provided with a convex outer surface curving outwardly and rearwardly from the extreme end portion of said free end which forms a scraping means for cleaning the groove of foreign matter and whereby foreign matter in said groove tends to force said tongue inwardly into said groove.

5. A packing ring including, a split annulus having an arcuate groove in its outer and bottom sides, said annulus having an upper beveled surface defining the upper boundary of said groove extending inwardly and upwardly from the outer side of the annulus and a second surface extending downwardly at an angle from said upper beveled surface and defining the other side of the groove, and an arcuate bridging member projecting from the other end of the annulus and arranged to engage within said groove, said bridging member having an arcuate upper beveled surface abutting said upper beveled surface of the annulus and a second surface extending downwardly at an angle from the beveled surface of the bridging member, said bridging member being cammed inwardly by the engagement of said beveled surfaces by forces acting downwardly and outwardly on said annulus whereby said bridging member is prevented from projecting radially outwardly beyond the outer side of the annulus, said bridging member having a free end provided with a convex outer surface curving outwardly and rearwardly from the extreme end portion of said free end which forms a scraping means for scraping foreign matter from said groove and whereby foreign matter in said groove tends to force said bridging member inwardly into said groove.

6. A packing ring including, a split annulus having a substantially circular groove in its outer and bottom sides, said annulus having an upper substantially circular beveled surface defining the upper side of the groove extending inwardly and upwardly from the outer side of the annulus and a second substantially circular surface extending downwardly at an angle from said beveled surface and defining the other side of the groove, and an annular bridging member disposed within said groove, said bridging member having a substantially circular beveled upper surface abutting said upper beveled surface of the annulus and a second surface extending downwardly at an angle from the beveled surface of the bridging member, said bridging member being retained in said groove by the engagement of said beveled surfaces which prevent said bridging member from projecting radially outwardly beyond the outer side of the annulus, said bridging member having free ends provided with convex outer surfaces curving outwardly and away from the extreme end portions of said free ends forming scraping members for scraping the adjacent portions of the groove and whereby foreign matter in said groove tends to force said ends inwardly into said groove.

7. A packing ring including, a split annulus having an annular circumferential groove, a substantially annular split bridging member disposed in said groove, said annulus and said bridging member having abutting arcuate bevel surfaces concentric with said annulus whereby said bridging member is cammed toward said annulus by forces acting downwardly on said annulus to prevent said bridging member from projecting radially with respect to said annulus, said bridging member having free ends provided with convex outer surfaces curving outwardly and away from the extreme end portions of said free ends forming scraping means for freeing the groove of foreign matter adjacent said ends and whereby foreign matter in said groove tends to force said ends inwardly into said groove.

References Cited in the file of this patent
UNITED STATES PATENTS

| | | |
|---|---|---|
| 1,346,237 | Murray | July 13, 1920 |
| 1,369,203 | Stouffer | Feb. 22, 1921 |
| 1,393,211 | Frykman | Oct. 11, 1921 |
| 1,532,547 | Pruyn | Apr. 7, 1925 |
| 2,080,935 | Slyk | May 18, 1937 |
| 2,459,157 | Frisby | Jan. 18, 1949 |
| 2,662,801 | Baker | Dec. 15, 1953 |